J. BENGUÉ.
MEANS FOR CLOSING GLASS BOTTLES FOR CHLORIDE OF ETHYL AND OTHER VOLATILE PRODUCTS.
APPLICATION FILED AUG. 27, 1921.
1,414,169. Patented Apr. 25, 1922.
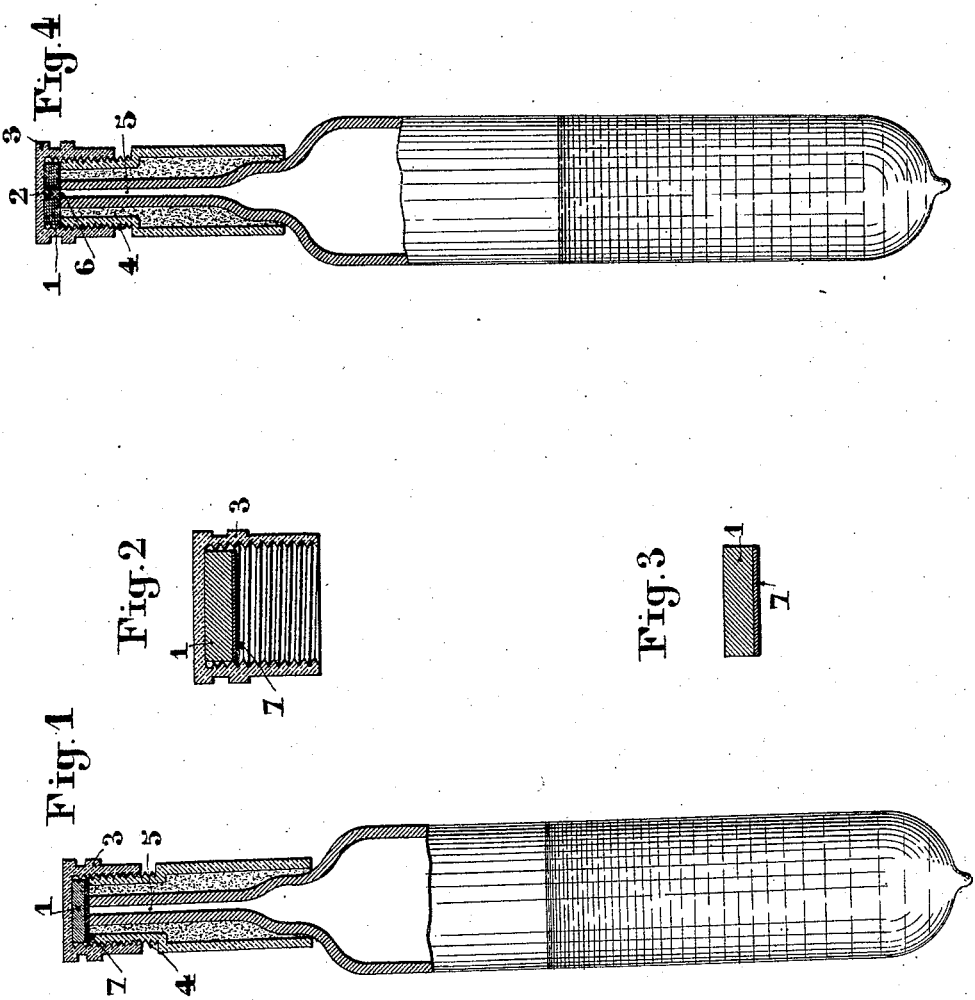
INVENTOR
JULES BENGUÉ
BY
ATTORNEYS

UNITED STATES PATENT OFFICE.

JULES BENGUÉ, OF PARIS, FRANCE.

MEANS FOR CLOSING GLASS BOTTLES FOR CHLORIDE OF ETHYL AND OTHER VOLATILE PRODUCTS.

1,414,169.     Specification of Letters Patent.     Patented Apr. 25, 1922.

Application filed August 27, 1921. Serial No. 495,907.

(GRANTED UNDER THE PROVISIONS OF THE ACT OF MARCH 3, 1921, 41 STAT. L., 1313.)

*To all whom it may concern:*

Be it known that I, JULES BENGUÉ, a citizen of the French Republic, and residing in Paris, France, 47 Rue Blanche, have invented certain new and useful Improvements in and Relating to Means for Closing Glass Bottles for Chloride of Ethyl and Other Volatile Products (for which I have filed an application in France Sept. 3, 1919, No. 512,647,) of which the following is a complete specification.

The chloride of ethyl bottles provided with a metallic closing means, as introduced by the inventor in 1891, have a disadvantage which it is difficult to remedy, this drawback consisting in the too frequent obstruction of the capillary orifice so that the operator when using the bottle finds that he has in hand a flask which does not work.

The reasons for such obstruction are as follows:

(1) The rubber obturator or plug allows sulphur in dust-like form which escapes from the plug, when the temperature falls, to pass into the capillary canal and obstruct the same.

(2) The rubber is attacked more or less by the chloride of ethyl, it softens, disintegrates and particles thereof may be sucked up and also cause choking of the capillary canal.

According to the present invention these defects have been remedied by placing the capillary canal or duct under protection from all contact with the india-rubber. To that end the rubber washer is lined with a plastic non-porous substance not sensitive to the attack of chloride of ethyl and not releasing or throwing off any dust which may consist for example of a sheet of celophany, colophonium or gelatine rendered supple by the addition of a certain amount of glycerine or any other substance possessing the same properties. The best result will be obtained with a sheet of tin arranged between the rubber washer and the capillary canal.

In the centre of the rubber washer, which is also pierced with a hole, there may also be placed a disk of cork which alone will be in contact with the capillary orifice.

In this way any contact of the rubber with the capillary orifice and consequently any obstruction thereof is entirely prevented, the rubber only acting as a spring due to its inherent elasticity.

In the accompanying drawings, which show constructional examples of the subject matter of the invention as applied to a glass chloride of ethyl tube:

Figure 1 is an elevation with part in section of a flask or bottle with its closing means improved by means of a washer not subject to the attacks of the chloride of ethyl.

Figure 2 is a vertical section, on a larger scale, of a closing stopper provided with its washer.

Figure 3 is a detail of the rubber washer lined with its projecting washer.

Figures 4 to 6 are similar views of a modified closing device comprising a central disc of cork.

In order to carry out the invention there is placed upon the rubber washer 1 a protective washer 7 which may be made of celophany or gelatine made supple with glycerine, or other suitable substance. The said washer 7 will however be preferably made of tin. The whole body thus formed is placed in the bottom of the cap or stopper 3 which is so screwed upon the neck of the bottle that the capillary orifice 5 of the said bottle may only be in contact with the projecting washer 7.

In the constructional form according to figures 4 to 6 the rubber washer 1 is traversed right through by a central hole in which there is placed a s mall cork cylinder 2. The whole body of the washer thus formed is also so placed at the bottom of the cap or stopper 3 that the capillary orifice 5 is merely closed by the uncovered base 6 of the cork cylinder.

As will be clearly understood the rubber of the washer may be replaced in both cases by any other plastic substance. The protective washer 7 as well as the cork cylinder 2 may be made of any plastic substance not subject to attack by the liquid contained in the flask or bottle, the said washer 7 however, being, in the preferred form of construction, made of tin.

In the structural form according to Figures 4 to 6 the cork cylinder may be replaced by a block in the form of a truncated cone the small base of which would be in contact with the capillary hole.

The contact surface of the protective washer or of the cork cylinder with the rubber, may be provided with asperities engaging the recesses made in the rubber.

The invention may also be realized by hollowing out the rubber into a small recess in which there is placed an inverted truncated cone of cork, gelatine, celophany, or other suitable substance, such as tin, the large base of which would be in contact with the capillary orifice, the elasticity of the closure being obtained in every case by the rubber washer which is protected against attack, its contact with the capillary orifice being prevented by the protective organ.

What I claim is:

1. A closure for glass flasks for containing chloride of ethyl or like liquid having within it a rubber disk provided with a protecting lining extending approximately over its entire inner face.

2. A closure for glass flasks for containing chloride of ethyl or like liquid having within it a rubber disk provided with a pliable metallic lining extending approximately over the entire inner face thereof.

3. A closure for glass flasks for containing chloride of ethyl or like liquid, comprising a cap, a rubber disk in the cap, and a thin pliable tin disk approximately of the same size as the rubber disk on the inner face of the same.

In testimony I have hereunto set my hand at Paris (France), this douze août day 1921.

JULES BENGUÉ.